United States Patent
Hsiao et al.

(10) Patent No.: US 12,132,425 B2
(45) Date of Patent: Oct. 29, 2024

(54) MOTOR DRIVE SYSTEM AND TORQUE DISTRIBUTION METHOD THEREOF

(71) Applicant: Delta Electronics, Inc., Taoyuan (TW)

(72) Inventors: Chih-Hung Hsiao, Taoyuan (TW);
Chung-Hsing Ku, Taoyuan (TW);
Shang-Wei Chiu, Taoyuan (TW);
Zhi-Sheng Yang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 145 days.

(21) Appl. No.: 18/074,276

(22) Filed: Dec. 2, 2022

(65) Prior Publication Data

US 2024/0079981 A1 Mar. 7, 2024

(30) Foreign Application Priority Data

Sep. 6, 2022 (CN) .......................... 202211085694.4

(51) Int. Cl.
*H02P 21/22* (2016.01)
*H02P 21/20* (2016.01)

(52) U.S. Cl.
CPC .............. *H02P 21/22* (2016.02); *H02P 21/20* (2016.02)

(58) Field of Classification Search
CPC ............. H02P 21/22; H02P 21/20; H02P 5/00
USPC ............................ 318/400.02, 400.01, 700
See application file for complete search history.

(56) References Cited

U.S. PATENT DOCUMENTS

| | | | |
|---|---|---|---|
| 7,893,637 B2 | 2/2011 | Suhama et al. | |
| 8,994,304 B2 * | 3/2015 | Bae | H02P 21/0085 363/21.01 |
| 2015/0115850 A1 | 4/2015 | Laursen | |
| 2020/0266743 A1 | 8/2020 | Li et al. | |
| 2021/0111661 A1 | 4/2021 | Pramod et al. | |
| 2021/0309112 A1 | 10/2021 | Murthy et al. | |
| 2022/0231624 A1 | 7/2022 | Balamurali et al. | |

FOREIGN PATENT DOCUMENTS

| | | |
|---|---|---|
| CN | 107112939 A | 8/2017 |
| CN | 109194221 A | 1/2019 |
| CN | 109039197 B | 1/2022 |
| JP | 2018127956 A | 8/2018 |
| TW | 201817153 A | 5/2018 |
| TW | 202027403 A | 7/2020 |

* cited by examiner

*Primary Examiner* — David Luo
(74) *Attorney, Agent, or Firm* — KIRTON McCONKIE; Evan R. Witt

(57) ABSTRACT

A motor drive system includes an electric motor, a drive circuit and a control unit. The drive circuit provides a driving current to the electric motor. A current command generator of the control unit generates a current command according to a torque command and a motor operating information. The driving current is converted into a d-axis current and/or a q-axis current by the control unit. Consequently, the driving current is close to the d-axis current command and/or the q-axis current command corresponding to the current command. If a value of the torque command is positive, the current command generator generates the corresponding current command according to a MTPA lookup table. If the value of the torque command is negative, the current command generator generates the corresponding current command according to a zero recycle lookup table.

26 Claims, 7 Drawing Sheets

MOTOR DRIVE SYSTEM AND TORQUE DISTRIBUTION METHOD THEREOF

FIELD OF THE INVENTION

The present invention relates to a drive system, and more particularly to a motor drive system and a torque distribution method of the motor drive system.

BACKGROUND OF THE INVENTION

Generally, a motor drive system includes a DC power supply, a drive circuit and an electric motor. During the power running process of the electric motor, electric power can be bidirectionally supplied and received among the DC power supply, the drive circuit and the electric motor. More specifically, the drive circuit drives the electric motor to output a positive torque or a negative torque according to the value of a torque command value. If the value of the torque command value is positive, the drive circuit drives the electric motor to output the positive torque. In response to the positive torque, a load is driven to rotate in a forward direction. Whereas, if the value of the torque command value is negative, the drive circuit drives the electric motor to output the negative torque to resist the positive torque of the load. Generally, while the electric motor is driven to output the negative torque, the electric motor also generates recycling power. The recycling power can be recycled and reused. For example, in case that the DC power supply of the motor drive system includes a secondary battery, the recycling power can be recycled to charge the secondary battery.

However, under some conditions, if the recycling power generated by the electric motor cannot be effectively recycled, some drawbacks occur. For example, in a situation, the electric motor is applied to a high-speed railway train. In case that the train brakes at a high speed and the utility power is subjected to interruption, the recycling power recycled from the drive circuit to the DC power supply cannot be consumed. Under this circumstance, the drive circuit is possibly damaged, or the recycling power is pushed into the power grid to result in an islanding effect.

For example, in another situation, the electric motor is applied to an electric vehicle. It is assumed that the electric vehicle is fully charged and driven to a high mountain. Due to the low temperature on the high mountain, the capability of the secondary battery of the electric motor is usually halved. When the electric vehicle goes down the mountain, the secondary battery is unable to receive the recycling power because of the frequent brake action. Accordingly, the electric vehicle can only be braked in a mechanical wear manner, which may result in that the electric vehicle is possibly overheated or unable to efficiently consume the recycling power.

Moreover, in case that the electric motor is applied to a plug-in hybrid electric vehicle (PHEV) or a fuel cell vehicle, the energy storage capacity of the secondary battery in the vehicle is limited because the main power supply source is an internal combustion engine or a fuel cell. Since the secondary battery is usually unable to instantly reuse the large recycling power, the electric motor cannot be used to brake the vehicle. Although the combination of a super capacitor and a braking resistor can be added to achieve the motor braking purpose, some other problems occur. For example, the arrangement of the super capacitor and the braking resistor leads to the reduction of the available space inside the vehicle and increases the cost of the vehicle. Moreover, since the weight of the vehicle is increased, the endurance of the vehicle is adversely affected.

Therefore, there is a need of providing an improved motor drive system and a torque distribution method of the motor drive system in order to overcome the drawbacks of the conventional technologies.

SUMMARY OF THE INVENTION

An object of the present invention provides a motor drive system. The control unit of the motor drive system issues a current command according to a torque command, a motor operating information of the electric motor, and the zero recycle lookup table to control the operations of the electric motor. Accordingly, the recycling power of the electric motor is suppressed by the consumed power of the electric motor. Consequently, the braking applications of the electric motor are increased, and the reliability of the braking process is enhanced. Moreover, the mechanical wear and the accumulated heat are reduced, and the motor drive system is not damaged by the recycling power. Since no additional devices are required to consume the recycling power, the space utilization of the motor drive system is increased, and the fabricating cost is reduced.

Another object of the present invention provides a motor drive system and a torque distribution method of the motor drive system. The motor drive system includes two electric motors. In response to a torque command, two electric motors are controlled to cooperatively work. Consequently, the braking capacity of the motor drive system is enhanced. Moreover, in an emergency state, the larger negative torque is provided so that the operating safety is enhanced.

A further object of the present invention provides a motor drive system and a torque distribution method of the motor drive system. The motor drive system includes two electric motors and a secondary battery. In response to a torque command, the two electric motors are controlled to cooperatively work to generate the recycling power. The secondary battery is charged by the recycling power according to a designed charging strategy. Consequently, the secondary battery is effectively protected.

In accordance with an aspect of the present invention, a motor drive system is provided. The motor drive system includes an electric motor, a drive circuit and a control unit. The drive circuit is used for converting an input power into a driving current. The driving current is provided to the electric motor to drive the electric motor. The control unit receives a torque command. The control unit includes a current command generator. The current command generator generates a current command according to the torque command and a motor operating information of the electric motor. The current command contains a d-axis current command and/or a q-axis current command. The driving current is converted into a d-axis current and/or a q-axis current by the control unit through coordinate conversion, and the drive circuit is controlled by the control circuit. Consequently, the driving current is close to the d-axis current command and/or the q-axis current command corresponding to the current command. The current command generator contains a maximum torque per ampere (MTPA) lookup table and a zero recycle lookup table. The MTPA lookup table is a lookup table about a relationship between the torque command and the current command according to the motor operating information when a consumed power of the electric motor is the lowest. The zero recycle lookup table is a lookup table about a relationship between the torque command and the current command according to the motor operating information when the consumed power of the electric motor and a recycling power of the electric motor are offset. If a value of the torque command is positive, the current command generator generates the corresponding current command according to the MTPA lookup table. If the value of the torque command is negative, the current command generator generates the corresponding current command according to the zero recycle lookup table in case that the motor drive system includes no secondary battery.

In accordance with another aspect of the present invention, a motor drive system is provided. The motor drive system includes an electric motor, a drive circuit and a control unit. The electric motor includes a first electric motor and a second electric motor. The drive circuit includes a first drive circuit and a second drive circuit. The control unit includes a torque distribution unit, a first drive circuit and a second drive circuit. The first drive circuit is used for converting an input power into a first driving current. The first driving current is provided to the first electric motor to drive the first electric motor. The second drive circuit is used for converting an input power into a second driving current. The second driving current is provided to the second electric motor to drive the second electric motor. The torque distribution unit receives a torque command, and the torque distribution unit distributes the torque command into a first torque command and a second torque command to the first control unit and the second control unit, respectively. The first control unit includes a first current command generator, and the first current command generator generates a first current command according to the first torque command and a first motor operating information of the first electric motor. The first current command contains a first d-axis current command and/or a first q-axis current command. The first driving current is converted into a first d-axis current and/or a first q-axis current by the first control unit through coordinate conversion. The first drive circuit is controlled by the first control circuit. Consequently, the first driving current is close to the first d-axis current command and/or the first q-axis current command corresponding to the first current command. The second control unit includes a second current command generator, and the second current command generator generates a second current command according to the second torque command and a second motor operating information of the second electric motor. The second current command contains a second d-axis current command and/or a second q-axis current command. The second driving current is converted into a second d-axis current and/or a second q-axis current by the second control unit through coordinate conversion. The second drive circuit is controlled by the second control circuit. Consequently, the second driving current is close to the second d-axis current command and/or the second q-axis current command corresponding to the second current command. The first current command generator contains a first negative torque current lookup table. The first negative torque current lookup table is a lookup table about a relationship between the first torque command and the first current command when the first electric motor is driven to output a negative torque according to the first motor operating information of the first electric motor. The second current command generator contains a second negative torque current lookup table. The second negative torque current lookup table is a lookup table about a relationship between the second torque command and the second current command when the second electric motor is driven to output a negative torque according to the second motor operating information of the second electric motor. If a value of the first torque command is negative, the first current command generator generates the corresponding first current command according to the first negative torque current lookup table. If a value of the second torque command is negative, the second current command generator generates the corresponding second current command according to the second negative torque current lookup table.

In accordance with a further aspect of the present invention, a torque distribution method is provided. The torque distribution method is applied to the torque distribution unit of the motor drive system, and includes steps of: (a) calculating the first torque command according to the torque command; (b) judging if the battery voltage of the secondary battery is higher than the preset reference voltage range; (c) if a judging result of the step (b) is yes, increasing the reference current; (d) judging if the reference current is higher than a maximum chargeable current; (e) if a judging result of the step (d) is yes, limiting the reference current to be equal to the maximum chargeable current; (f) judging if the reference current is higher than the battery current of the secondary battery; (g) if a judging result of the step (f) is yes, increasing the first torque command; (h) judging if the first torque command is higher than the torque command; (i) if a judging result of the step (h) is yes, limiting the first torque command to be equal to the torque command; (j) outputting the first torque command; (k) outputting the second torque command obtained by subtracting the first torque command from the torque command; (l) if a judging result of the step (b) is no, decreasing the reference current and performing the step (f); and (m) if a judging result of the step (f) is no, decreasing the first torque command and performing the step (j), wherein if a judging result of the step (d) is no, the step (f) is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
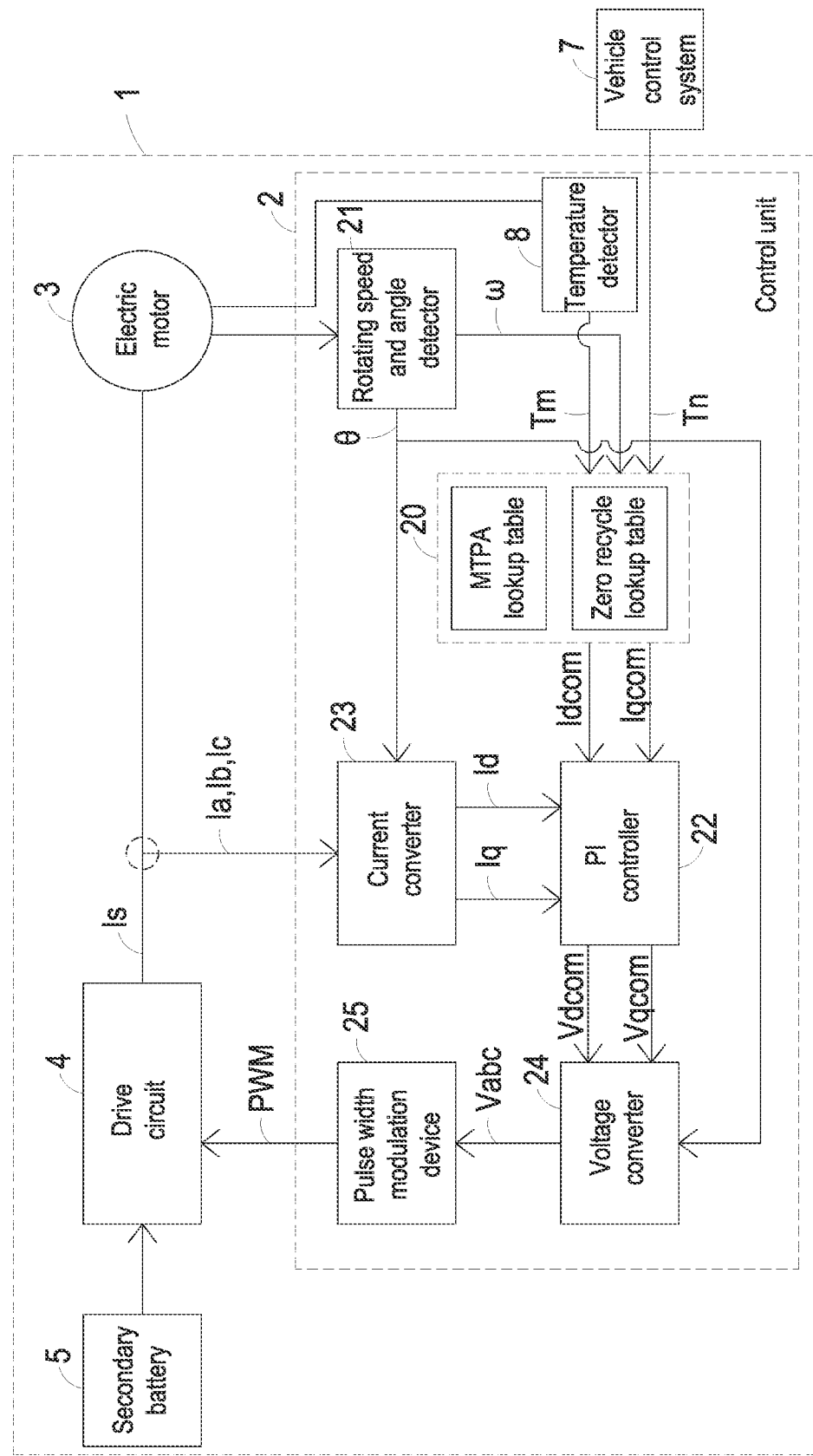
FIG. 1 is a schematic circuit block diagram illustrating a motor drive system according to a first embodiment of the present invention.
Figure 2:
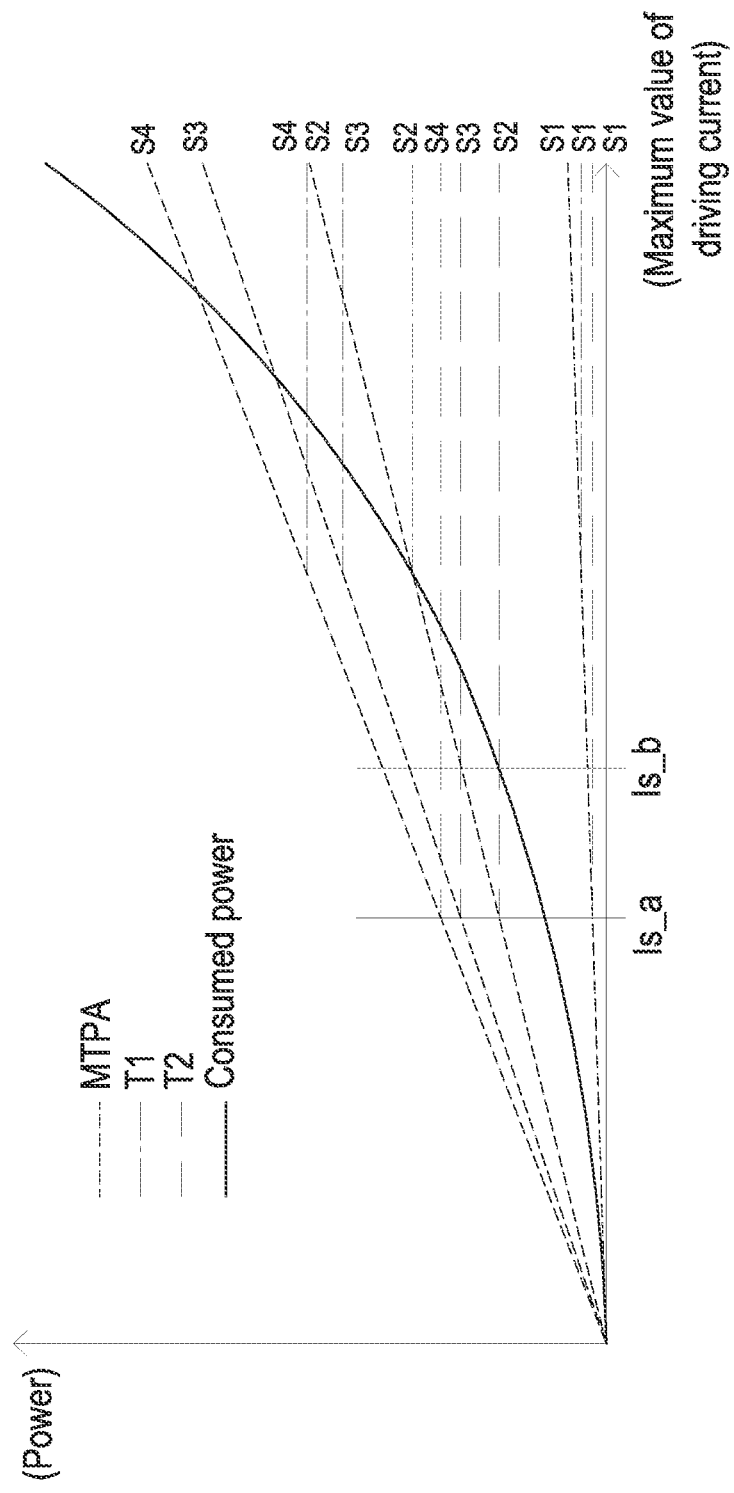
FIG. 2 is a plot illustrating the changes of the consumed power and the recycling power of an electric motor of the motor drive system of FIG. 1 with respect to the maximum value of the driving current received by the electric motor.
Figure 3:
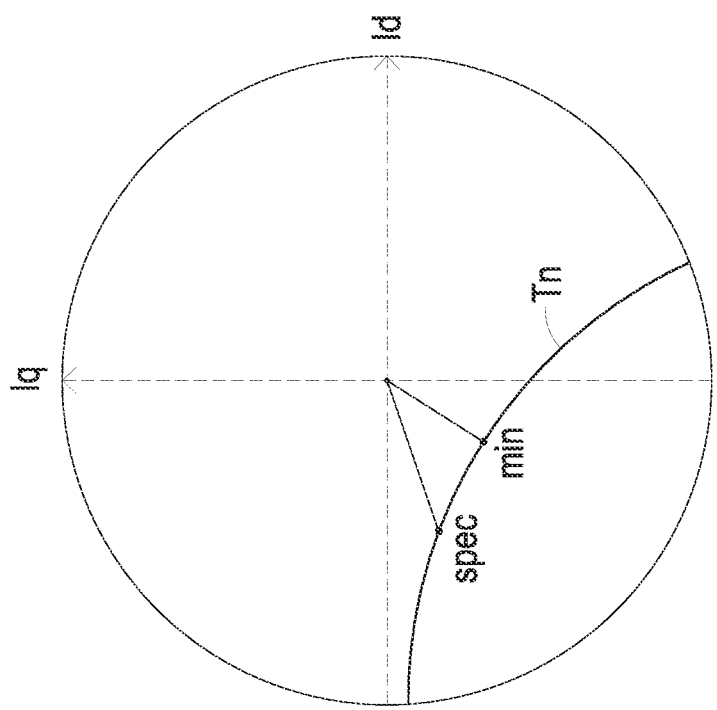
FIG. 3 is a plot illustrating the relationship between the torque command and the maximum value of the driving current of the motor drive system as shown in FIG. 1 in the dq coordinate system.

Please refer to FIGS. 1, 2 and 3. FIG. 1 is a schematic circuit block diagram illustrating a motor drive system according to a first embodiment of the present invention. FIG. 2 is a plot illustrating the changes of the consumed power and the recycling power of an electric motor of the motor drive system of FIG. 1 with respect to the maximum value of the driving current received by the electric motor. FIG. 3 is a plot illustrating the relationship between the torque command and the maximum value of the driving current of the motor drive system as shown in FIG. 1 in the dq coordinate system. Preferably but not exclusively, the motor drive system 1 of the present invention can be applied to a high-speed railway train, an electric vehicle, a plug-in hybrid vehicle or a fuel cell vehicle. Moreover, each of the high-speed railway train, the electric vehicle, the plug-in hybrid vehicle and the fuel cell vehicle includes a vehicle control system 7 for controlling the operations thereof.

The motor drive system 1 includes a control unit 2, an electric motor 3 and a drive circuit 4. Preferably but not exclusively, the driving circuit 4 is an inverter that can transmit electric power in both directions. The drive circuit 4 is electrically connected with the electric motor 3. After the input power is converted by the drive circuit 4, a driving voltage and a driving current Is are generated and provided to the electric motor 3. Consequently, the electric motor 3 is driven to output a positive torque or a negative torque. The circuitry structure of the drive circuit 4 is well known to those skilled in the art, and not redundantly described herein.

In response to the positive toque or the negative torque from the electric motor 3, a load (not shown) is correspondingly rotated. For example, in response to the positive torque, the load is driven to rotate in a forward direction. Whereas, in response to the negative torque, the load is driven to rotate in a reverse direction. When the electric motor 3 outputs the positive torque, the electric motor 3 is operated in a motor mode. When the electric motor 3 outputs the negative torque to brake, the electric motor 3 is operated in a generator mode to generate a recycling power. Hereinafter, a three-phase electric motor is taken as an example of the electric motor 3. It is noted that the type of the electric motor 3 is not restricted.

The control unit 2 receives a torque command Tn from the vehicle control system 7. If the value of the torque command Tn is positive, the electric motor 3 is driven to output the positive torque. Whereas, if the value of the torque command Tn is negative, the electric motor 3 is driven to output the negative torque. In an embodiment, the control unit 2 includes a current command generator 20 for generating a current command. The current command is generated according to the torque command Tn and a motor operating information of the electric motor 3. The current command contains a d-axis current command Idcom and/or a q-axis current command Iqcom. Moreover, after the control unit 2 performs coordinate conversion on the driving current Is, the driving current Is is converted into a d-axis current Id and/or a q-axis current Iq. Under the control of the control unit 2, the driving current Is provided by the drive circuit 4 is close to the current command (i.e., the d-axis current command and/or the q-axis current command).

The current command generator 20 contains a maximum torque per ampere (MTPA) lookup table and a zero recycle lookup table. The MTPA lookup table is a lookup table about the relationship between the torque command Tn and the current command according to the motor operating information when the consumed power of the electric motor 3 is the lowest. The zero recycle lookup table is a lookup table about the relationship between the torque command Tn and the current command according to the motor operating information when the consumed power and the recycling power of the electric motor 3 are offset. In an embodiment, the motor operating information contains a rotating speed or any other appropriate operating information of the electric motor 3. If the value of the torque command Tn is positive, the current command generator 20 generates the corresponding current command according to the MTPA lookup table. Whereas, if the value of the torque command Tn is negative, the current command generator 20 generates the corresponding current command according to the zero recycle lookup table.

In an embodiment, the control unit 2 further includes a rotating speed and angle detector 21, a proportional-integral (PI) controller 22, a current converter 23, a voltage converter 24 and a pulse width modulation device 25.

The rotating speed and angle detector 21 generates a rotating speed information co according to the rotating speed of the electric motor 3. Moreover, the rotating speed and angle detector 21 generates an angle information θ according to the rotation angle of the electric motor 3. The motor operating information of the electric motor 3 contains the rotating speed information co and the angle information θ. The rotating speed information co is provided to the current command generator 20. The angle information θ is provided to the current converter 23 and the voltage converter 24.

The current converter 23 retrieves the driving current Is flowing into the electric motor 3 and obtains the corresponding currents. For example, as shown in FIG. 1, the current converter 23 retrieves the three-phase driving current Is and obtains the single-phase currents Ia, Ib and Ic. After the single-phase currents Ia, Ib and Ic of the driving current Is are subjected to coordinate conversion by the current converter 23 according to the angle information θ, the d-axis current Id and/or the q-axis current Iq is generated.

The PI controller 22 performs a proportional-integral (PI) control operation according to the d-axis current Id and/or the q-axis current Iq and the d-axis current command Idcom and/or the q-axis current command Iqcom. Consequently, the PI controller 22 generates a d-axis voltage command Vdcom and/or a q-axis voltage command Vqcom.

The voltage converter 24 receives the d-axis voltage command Vdcom and/or the q-axis voltage command Vqcom. After the d-axis voltage command Vdcom and/or the q-axis voltage command Vqcom is subjected to coordinate conversion by the voltage converter 24 according to the angle information θ, a three-phase driving voltage command Vabc is generated.

The pulse width modulation device 25 generates a pulse width modulation signal PWM according to the driving voltage command Vabc. The pulse width modulation signal PWM is transmitted to the drive circuit 4. According to the pulse width modulation signal PWM, the on/off states of the switch elements (not shown) in the drive circuit 4 are controlled. Consequently, the driving voltage and the driving current Is to be transmitted from the drive circuit 4 to the electric motor 3 are correspondingly adjusted. In this way, the drive current Is provided by the drive circuit 4 is close to the current command (i.e., the d-axis current command and/or the q-axis current command).

It is noted that the electric motor 3 is not restricted to the three-phase electric motor as long as the electric motor 3 is a permanent-magnet synchronous motor (PMSM). For example, in some embodiments, the electric motor 3 is a multi-phase electric motor with more than three phases. Correspondingly, the drive circuit 4 provides a multi-phase driving voltage and a multi-phase driving current to the electric motor 3. The current converter 23 retrieves the multi-phase driving current flowing into the electric motor 3 and obtains the corresponding single-phase currents. After the single-phase currents of the multi-phase driving current are subjected to coordinate conversion by the current converter 23 according to the angle information θ, the d-axis current Id and/or the q-axis current Iq is generated. Similarly, the voltage converter 24 receives the d-axis voltage command Vdcom and/or the q-axis voltage command Vqcom. After the d-axis voltage command Vdcom and/or the q-axis voltage command Vqcom is subjected to coordinate conversion by the voltage converter 24 according to the angle information θ, a multi-phase driving voltage command is generated. Similarly, the pulse width modulation device 25 generates a pulse width modulation signal PWM according to the multi-phase driving voltage command. The pulse width modulation signal PWM is transmitted to the switch elements of the drive circuit 4.

Please refer to FIGS. 2 and 3 again. In FIG. 2, several curves in four types are shown.

The first type curve ("consumed power") represents the relationship between the consumed power of the electric motor 3 and the maximum value of the driving current Is received by the electric motor 3. As the maximum value of the driving current Is increases, the consumed power of the electric motor 3 rises exponentially. Especially, the consumed power of the electric motor 3 is not influenced by different torque commands and different motor operating information of the electric motor 3 (e.g., the rotating speed information).

The second type curve ("MTPA) represents the relationship between the recycling power of the electric motor 3 and the maximum value of the driving current Is received by the electric motor 3 in a maximum torque per ampere (MTPA) control manner. As the maximum value of the driving current Is increases, the recycling power of the electric motor 3 rises linearly. In the conventional motor drive system, the drive circuit generates the driving current according to the received torque command in the MTPA control manner, so that the minimum value of the driving current corresponding to the matched torque command is selected. In case that the value of the torque command Tn received by the motor drive system 1 of the present invention is negative, the second type curve represents the relationship between the recycling power of the electric motor 3 and the maximum value of the driving current Is received by the electric motor 3 in the MTPA control manner. Consequently, the operation of the motor drive system 1 according to the torque command can achieve the optimum efficiency (i.e., the lowest consumed power). In the coordinate system of the d-axis current and the q-axis current, the origin indicates that both of the d-axis current and the q-axis current are zero. As shown in FIG. 3, the shortest distance between the origin and the torque command Tn is the minimum value min of the driving current Is corresponding to the torque command Tn in the MTPA control manner. Further, different rotating speeds of the electric motor 3 result in different recycling powers generated by the electric motor 3. As shown in FIG. 2, four curves in the second type are related to four rotating speeds S1, S2, S3 and S4 of the electric motor 3. As the rotating speed of the electric motor 3 increases, the recycling power of the electric motor 3 increases.

The third type curve (T1) represents the relationship between the recycling power of the electric motor 3 and the maximum value of the driving current Is received by the electric motor 3 when the value of the torque command Tn is negative and maintained at a first torque value T1. As the minimum value of the driving current Is corresponding to the MTPA control manner gradually increases, the recycling power of the electric motor 3 is subjected to a change. Since different rotating speeds of the electric motor 3 result in different recycling powers generated by the electric motor 3, as shown in FIG. 2, four curves in the third type are related to four rotating speeds S1, S2, S3 and S4 of the electric motor 3 when the torque command Tn is maintained at the first torque value T1.

The fourth type curve (T2) represents the relationship between the recycling power of the electric motor 3 and the maximum value of the driving current Is received by the electric motor 3 when the value of the torque command Tn is negative and maintained at a second torque value T2. The second torque value T2 is larger than the first torque value T1. As the minimum value of the driving current Is corresponding to the MTPA control manner gradually increases, the recycling power of the electric motor 3 is subjected to a change. Since different rotating speeds of the electric motor 3 result in different recycling powers generated by the electric motor 3, as shown in FIG. 2, four curves in the fourth type are related to four rotating speeds S1, S2, S3 and S4 of the electric motor 3 when the torque command Tn is maintained at the second torque value T2.

From the third type curves and the fourth type curves mentioned above, it is clear that the recycling power generated by the electric motor 3 varies with the torque command.

The operations of the motor drive system 1 will be described as follows. Please refer to FIGS. 2 and 3. In case that the value of the received torque command Tn is positive, the driving current Is received by the electric motor 3 is controlled in the MTPA control manner. Generally, the rotating speed of the electric motor 3 is larger than the lowest speed limit. In case that the value of the received torque command Tn is negative and the driving current Is received by the electric motor 3 is controlled in the MTPA control manner, the recycling power generated by the electric motor 3 is usually higher than the consumed power of the electric motor 3.

Consequently, the portion of the recycling power generated by the electric motor 3 that is not offset by the consumed power of the electric motor 3 will be fed back to the drive circuit 4.

Please refer to FIG. 3. Under the condition of conforming to the torque command Tn, when the driving current Is is increased to a specified driving current spec from the minimum value min in the MTPA control manner to make the recycling power of the electric motor 3 equal to the consumed power of the electric motor 3, no excess recycling power will be fed back to the drive circuit 4 from the electric motor 3. For example, as shown in FIG. 2, in case that the value of the torque command Tn is maintained at the second torque value T2 and the electric motor 3 is rotated at the second rotating speed S2, if the driving current Is in the MTPA control manner is increased from a first current value Is_a to a second current value Is_b, the recycling power of the electric motor 3 is equal to the consumed power of the electric motor 3. In other words, in case that the value of the torque command Tn is negative, the current command generator 20 generates the corresponding current command according to the zero recycle lookup table. Consequently, the recycling power of the electric motor 3 is completely suppressed by the consumed power of the electric motor 3.

As mentioned above, in case that the value of the torque command Tn received by the control unit 2 of the motor drive system 1 is negative, the current command generator 20 generates the corresponding current command according to the zero recycle lookup table. Consequently, the recycling power of the electric motor 3 is completely suppressed by the consumed power of the electric motor 3. In this way, the braking applications of the electric motor 3 are increased, and the reliability of the braking process is enhanced. Moreover, the mechanical wear and the accumulated heat are reduced, and the motor drive system 1 is not damaged by the recycling power. Since no additional devices are required to consume the recycling power, the space utilization of the motor drive system 1 is increased, and the fabricating cost is reduced Please refer to FIG. 1 again. In an embodiment, the motor drive system 1 further includes a secondary battery 5. The secondary battery 5 is electrically connected with the drive circuit 4. Moreover, the secondary battery 5 provides the input power to the drive circuit 4, or the drive circuit 4 provides storage energy to charge the secondary battery 5. If the battery voltage of the secondary battery 5 is lower than a full threshold value, the secondary battery 5 is charged by the drive circuit 4. Whereas, if the battery voltage of the secondary battery 5 is not lower than the full threshold value, the charging operation is not performed on the secondary battery 5. The control unit 2 further provides the function of judging whether the battery voltage of the secondary battery 5 is lower than the full threshold value and/or the function of judging whether the secondary battery 5 is abnormal.

If the value of the torque command Tn received by the control unit 2 is negative and the control unit 2 judges that the battery voltage of the secondary battery 5 is not lower than the full threshold value or the secondary battery 5 is abnormal, the current command generator 20 generates the corresponding current command according to the zero recycle lookup table. Consequently, the recycling power of the electric motor 3 is suppressed by the consumed power of the electric motor 3. On the other hand, if the value of the torque command Tn received by the control unit 2 is negative and the control unit 2 judges that the battery voltage of the secondary battery 5 is lower than the full threshold value, the current command generator 20 generates the corresponding current command according to the MTPA lookup table. Consequently, the recycling power of the electric motor 3 is converted into the storage energy to charge the secondary battery 5 by the drive circuit 4 under control of the control unit 2.

Generally, the internal impedance of the electric motor 3 varies with temperature. For precisely suppressing the recycling power of the electric motor 3 with the consumed power of the electric motor 3 and largely reducing the influence of the temperature change, the control unit 2 further includes a temperature detector 8 for detecting the ambient temperature of the electric motor 3. According to the detection result, the temperature detector 8 issues a temperature information Tm to the current command generator 20 of the control unit 2. In other words, the motor operating information further contains the temperature information Tm. As mentioned above, the zero recycle lookup table in the current command generator 20 is a lookup table about the relationship between the torque command Tn and the current command according to the motor operating information when the consumed power and the recycling power of the electric motor 3 are offset. By referring to the zero recycle lookup table, the current command generator 20 generates the corresponding current command according to the motor operating information (including the rotating speed of the electric motor 3 and the ambient temperature of the electric motor 3), so that the recycling power of the electric motor 3 is completely suppressed by the consumed power of the electric motor 3. In other words, by referring to the zero recycle lookup table, the current command generator 20 converts the torque command Tn into the current command according to the rotating speed of the electric motor 3 when the consumed power and the recycling power of the electric motor 3 are offset. Alternatively, by referring to the zero recycle lookup table, the current command generator 20 converts the torque command Tn into the current command according to the rotating speed of the electric motor 3 and the ambient temperature of the electric motor 3 when the consumed power and the recycling power of the electric motor 3 are offset.

As mentioned above, if the battery voltage of the secondary battery 5 is lower than the full threshold value, the current command generator 20 generates the corresponding current command according to the MTPA lookup table. In case that the value of the torque command Tn is negative and given, the d-axis current component and the q-axis current component can be optimized. Consequently, the magnitude of the driving current Is for driving the electric motor 3 is minimized, and the consumed power of the electric motor 3 is reduced. However, if the battery voltage of the secondary battery 5 is not lower than the full threshold value or the secondary battery 5 is abnormal, the secondary battery 5 cannot be charged to recycle the recycling power of the electric motor 3. Under this circumstance, the current command generator 20 generates the corresponding current command according to the zero recycle lookup table. In this way, the driving current Is is increased, and the consumed power of the electric motor 3 is increased to be equal to the recycling power of the electric motor 3. Since the recycling power of the electric motor 3 is completely suppressed by the consumed power of the electric motor 3, the above purposes of the present invention can be achieved.

Figure 4:
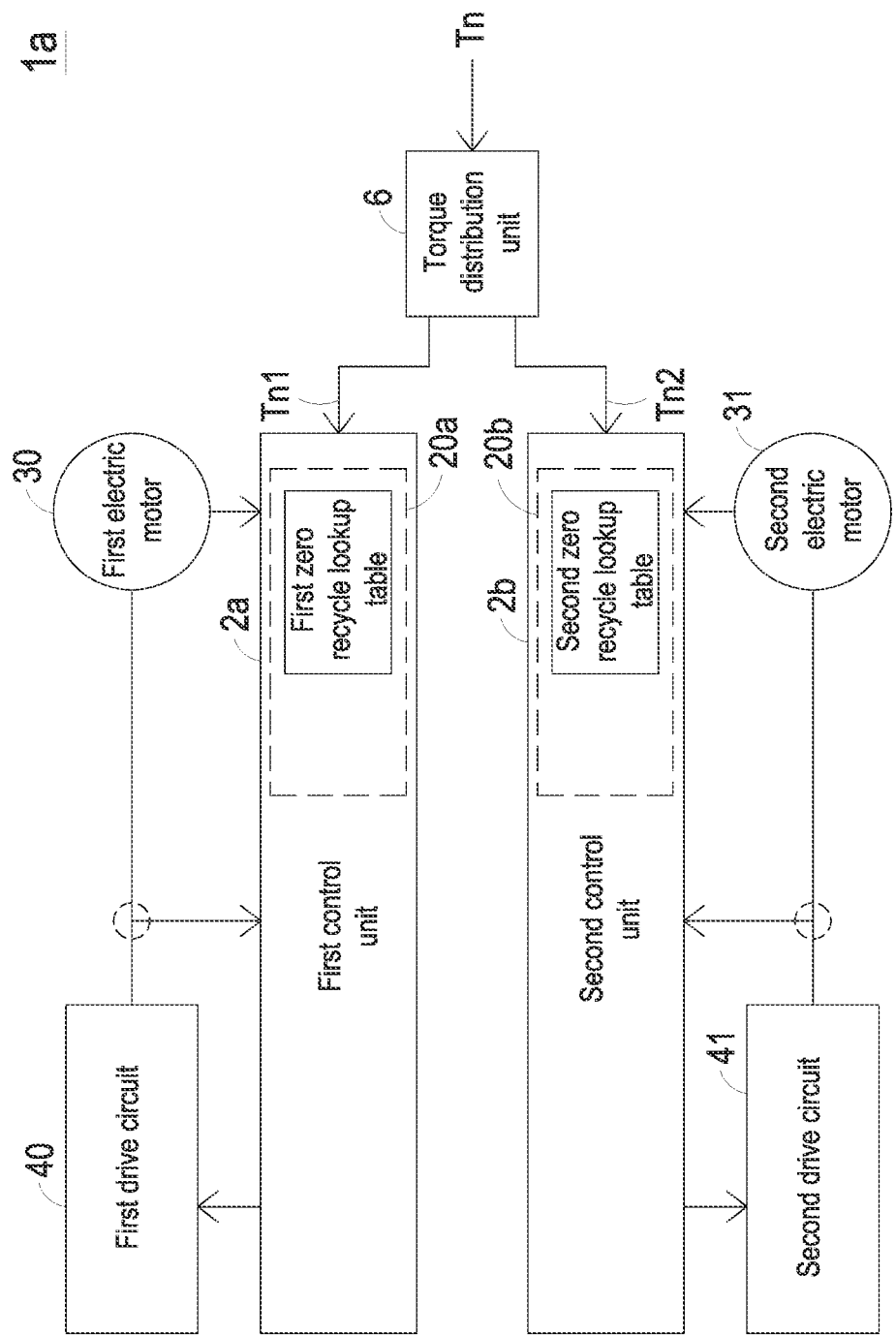
FIG. 4 is a schematic circuit block diagram illustrating a motor drive system according to a second embodiment of the present invention.

FIG. 4 is a schematic circuit block diagram illustrating a motor drive system according to a second embodiment of the present invention. In the motor drive system 1a of this embodiment, the electric motor includes a first electric motor 30 and a second electric motor 31, the drive circuit includes a first drive circuit 40 and a second drive circuit 41, and the control unit includes a first control unit 2a, a second control unit 2b and a torque distribution unit 6. After the input power is converted by the first drive circuit 40, a first driving current is provided to the first electric motor 30 to drive the first electric motor 30. After the input power is converted by the second drive circuit 41, a second driving current is provided to the second electric motor 31 to drive the second electric motor 31. The torque distribution unit 6 receives a torque command Tn, and the torque command Tn is distributed into a first torque command Tn1 and a second torque command Tn2 by the torque distribution unit 6. The first torque command Tn1 and the second torque command Tn2 are provided to the first control unit 2a and the second control unit 2b, respectively. The sum of the first torque command Tn1 and the second torque command Tn2 is equal to the torque command Tn. In an embodiment, the first electric motor 30 is a main electric motor, and the second electric motor 31 is an auxiliary electric motor. In case that the first electric motor 30 is unable to be operated according to the torque command Tn, the torque distribution unit 6 provides the first torque command Tn1 and the second torque command Tn2 to the first control unit 2*a* and the second control unit 2*b*, respectively. Consequently, the second electric motor 31 is operated to assist the first electric motor 30.

The operations and the structures of the first control unit 2*a* and the second control unit 2*b* are similar to those of the control unit 2 as shown in FIG. 1. The operations and the structures of the first drive circuit 40 and the second drive circuit 41 are similar to those of the drive circuit 4 as shown in FIG. 1. For succinctness, only the distinguished aspects of the first control unit 2*a*, the second control unit 2*b*, the first drive circuit 40 and the second drive circuit 41 will be described as follows.

The first control unit 2*a* includes a first current command generator 20*a* for generating a first current command. The first current command is generated according to the first torque command Tn1 and a motor operating information of the first electric motor 30. The first current command contains a first d-axis current command and/or a first q-axis current command. Moreover, after the first control unit 2*a* performs a coordinate conversion on the first driving current, the first driving current is converted into a first d-axis current and/or a first q-axis current. Under the control of the first control unit 2*a*, the first driving current provided by the first drive circuit 40 is close to the first current command (i.e., the first d-axis current command and/or the first q-axis current command).

The second control unit 2*b* includes a second current command generator 20*b* for generating a second current command. The second current command is generated according to the second torque command Tn2 and a motor operating information of the second electric motor 31. The second current command contains a second d-axis current command and/or a second q-axis current command. Moreover, after the second control unit 2*b* performs a coordinate conversion on the second driving current, the second driving current is converted into a second d-axis current and/or a second q-axis current. Under the control of the second control unit 2*b*, the second driving current provided by the second drive circuit 41 is close to the second current command (i.e., the second d-axis current command and/or the second q-axis current command).

The first current command generator 20*a* contains a first negative torque current lookup table. The first negative torque current lookup table is a lookup table about the relationship between the first torque command Tn1 and the first current command according to the first motor operating information when the first electric motor 30 is driven to output the negative torque. That is, the first current command generator 20*a* converts the first torque command Tn1 into the first current command according to the first motor operating information of the first electric motor 30 by referring to the first negative torque current lookup table. The second current command generator 20*b* contains a second negative torque current lookup table. The second negative torque current lookup table is a lookup table about the relationship between the second torque command Tn2 and the second current command according to the second motor operating information when the second electric motor 31 is driven to output the negative torque. That is, the second current command generator 20*b* converts the second torque command Tn2 into the second current command according to the second motor operating information of the second electric motor 31 by referring to the second negative torque current lookup table.

In case that the value of the first torque command Tn1 received by the first control unit 2*a* is negative, the first current command generator 20*a* generates the corresponding first current command according to the first negative torque current lookup table. In case that the value of the second torque command Tn2 received by the second control unit 2*b* is negative, the second current command generator 20*b* generates the corresponding second current command according to the second negative torque current lookup table.

In an embodiment, the first negative torque current lookup table contains a first zero recycle lookup table. The first zero recycle lookup table is a lookup table about the relationship between the first torque command Tn1 and the first current command according to the first motor operating information when the consumed power and the recycling power of the first electric motor 30 are offset. If the value of the first torque command Tn1 is negative, the first current command generator 20*a* generates the corresponding first current command according to the first zero recycle lookup table of the first negative torque current lookup table. Consequently, the consumed power of the first electric motor 30 and the recycling power of the first electric motor 30 are equal.

Moreover, the second negative torque current lookup table contains a second zero recycle lookup table. The second zero recycle lookup table is a lookup table about the relationship between the second torque command Tn2 and the second current command according to the second motor operating information when the consumed power and the recycling power of the second electric motor 31 are offset. If the value of the second torque command Tn2 is negative, the second current command generator 20*b* generates the corresponding second current command according to the second zero recycle lookup table of the second negative torque current lookup table. Consequently, the consumed power of the second electric motor 31 and the recycling power of the second electric motor 31 are equal.

In some other embodiments, the first negative torque current lookup table further contains a first recycle lookup table. The first recycle lookup table is a lookup table about the characteristics of the first electric motor 30, the recycling power of the first electric motor 30, and the relationship between the first torque command Tn1 and the first current command according to the first motor operating information when the first electric motor 30 is driven to output the negative torque. Moreover, the second negative torque current lookup table further contains a power consumption lookup table. The power consumption lookup table is a lookup table about the characteristics of the second electric motor 31, the consumed power of the second electric motor 31, and the relationship between the second torque command Tn2 and the second current command according to the second motor operating information when the second electric motor 31 is driven to output the negative torque. When the control unit judges that the value of the torque command Tn is negative, the torque command Tn is distributed into the first torque command Tn1 and the second torque command Tn2 by the torque distribution unit 6. The first current command generator 20*a* generates the corresponding first current command according to the first torque command Tn1 and the first recycle lookup table, and the second current command generator 20*b* generates the corresponding second current command according to the second torque command Tn2 and the power consumption lookup table. Under this operation, the recycling power of the first electric motor 30 and the consumed power of the second electric motor 31 are offset.

Figure 5:
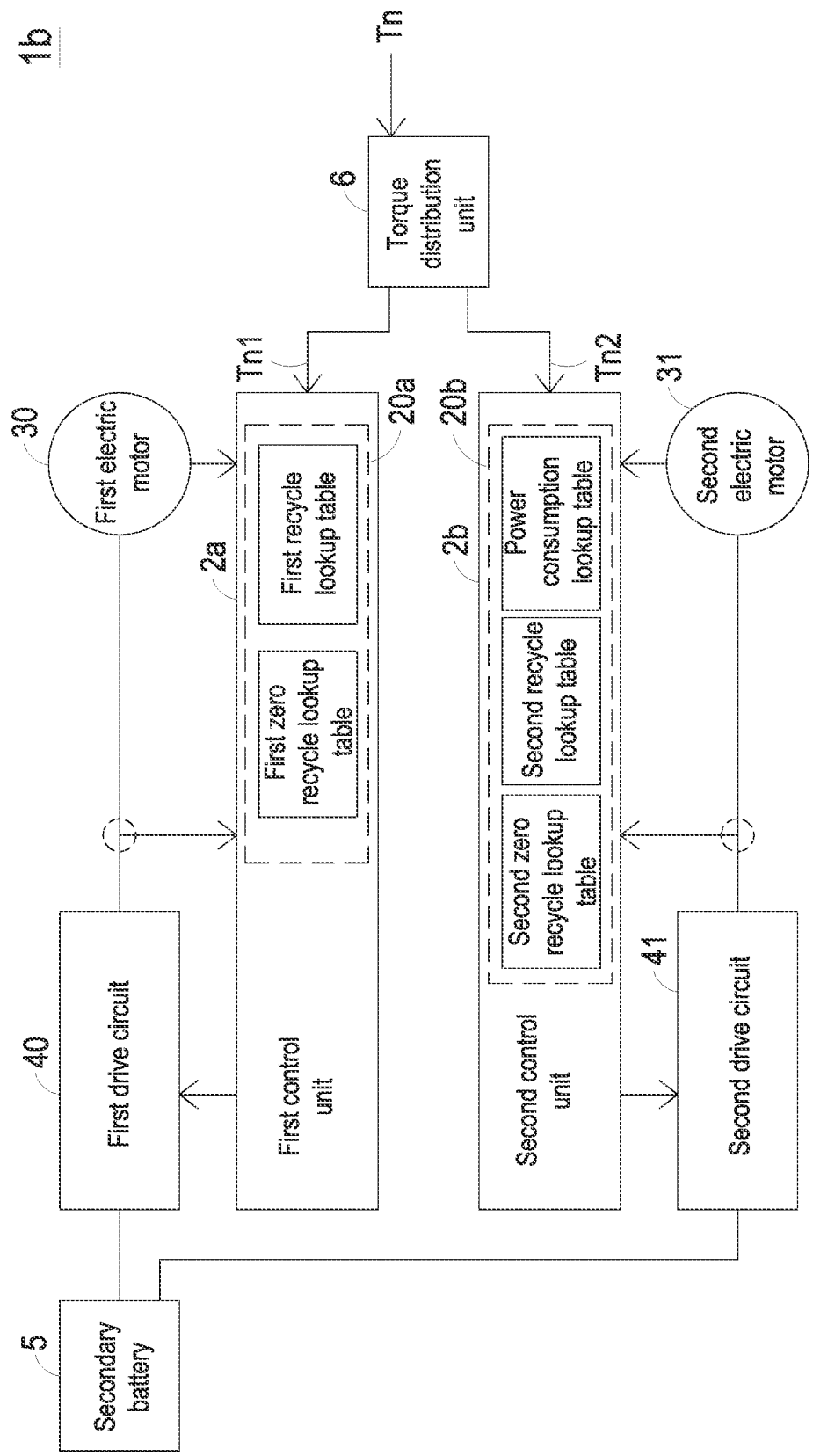
FIG. 5 is a schematic circuit block diagram illustrating a motor drive system according to a third embodiment of the present invention.

FIG. 5 is a schematic circuit block diagram illustrating a motor drive system according to a third embodiment of the present invention. In comparison with the motor drive system 1a of FIG. 4, the motor drive system 1b of this embodiment further includes a secondary battery 5. The secondary battery 5 is electrically connected with the first drive circuit 40 and the second drive circuit 41. Moreover, the secondary battery 5 provides the input power to the first drive circuit 40 and the second drive circuit 41, or the first drive circuit 40 and the second drive circuit 41 provide storage energy to charge the secondary battery 5. If the battery voltage of the secondary battery 5 is lower than a full threshold value, the secondary battery 5 is charged by the storage energy. Whereas, if the battery voltage of the secondary battery 5 is not lower than the full threshold value, the charging operation is not performed on the secondary battery 5.

When the control unit judges that the value of the torque command Tn is negative and the battery voltage of the secondary battery 5 is not lower than the full threshold value or the secondary battery 5 is abnormal, the torque command Tn is distributed into the first torque command Tn1 and the second torque command Tn2 by the torque distribution unit 6. The first current command generator 20a generates the corresponding first current command according to the first torque command Tn1 and the first zero recycle lookup table, and the second current command generator 20b generates the corresponding second current command according to the second torque command Tn2 and the second zero recycle lookup table. Under this operation, the consumed power of the first electric motor 30 and the recycling power of the first electric motor 30 are equal, and the consumed power of the second electric motor 31 and the recycling power of the second electric motor 31 are equal.

In an embodiment, the second negative torque current lookup table in the second current command generator 20b further contains a second recycle lookup table. The second recycle lookup table is a lookup table about the characteristics of the second electric motor 31, the recycling power of the second electric motor 31, and the relationship between the second torque command Tn2 and the second current command according to the second motor operating information when the second electric motor 31 is driven to output the negative torque. When the control unit judges that the value of the torque command Tn is negative and the battery voltage of the secondary battery 5 is lower than the full threshold value, the torque command Tn is distributed into the first torque command Tn1 and the second torque command Tn2 by the torque distribution unit 6. The first current command generator 20a generates the corresponding first current command according to the first torque command Tn1 and the first zero recycle lookup table. The second current command generator 20b generates the corresponding second current command according to the second torque command Tn2 and the second recycle lookup table. Under this operation, the consumed power of the first electric motor 30 is equal to the recycling power of the first electric motor 30. Further, the consumed power of the second electric motor 31 is lower than the recycling power of the second electric motor 31. The portion of the recycling power of the second electric motor 31 that is not offset by the consumed power of the second electric motor 31 is converted into the storage energy by the second drive circuit 41. Consequently, the secondary battery 5 is charged by the storage energy. In an embodiment, the second recycle lookup table can be the MTPA lookup table. The MTPA lookup table is the lookup table about the relationship between the second torque command Tn2 and the second current command according to the second motor operating information of the second electric motor 31 when the consumed power of the second electric motor 31 is the lowest.

In an embodiment, the second negative torque current lookup table in the second current command generator 20b further contains a power consumption lookup table. The power consumption lookup table is a lookup table about the characteristics of the second electric motor 31, the consumed power of the second electric motor 31, and the relationship between the second torque command Tn2 and the second current command according to the second motor operating information when the second electric motor 31 is driven to output the negative torque. When the control unit judges that the value of the torque command Tn is negative, the battery voltage of the secondary battery 5 is lower than the full threshold value and the secondary battery 5 provides electricity normally, the torque command Tn is distributed into the first torque command Tn1 and the second torque command Tn2 by the torque distribution unit 6. The first current command generator 20a generates the corresponding first current command according to the first torque command Tn1 and the first zero recycle lookup table. The second current command generator 20b generates the corresponding second current command according to the second torque command Tn2 and the power consumption lookup table. Under this operation, the consumed power of the first electric motor 30 is equal to the recycling power of the first electric motor 30. Further, the consumed power of the second electric motor 31 is higher than the recycling power of the second electric motor 31. In case that the secondary battery 5 outputs electric power, e.g. discharges electric power abnormally, the electric power from the secondary battery 5 can be offset by the consumed power of the second electric motor 31.

In an embodiment, the first negative torque current lookup table further contains a first recycle lookup table. The first recycle lookup table is a lookup table about the characteristics of the first electric motor 30, the recycling power of the first electric motor 30, and the relationship between the first torque command Tn1 and the first current command according to the first motor operating information when the first electric motor 30 is driven to output the negative torque. When the control unit judges that the value of the torque command Tn is negative, the battery voltage of the secondary battery 5 is lower than the full threshold value and the secondary battery 5 provides electricity normally, the torque command Tn is distributed into the first torque command Tn1 and the second torque command Tn2 by the torque distribution unit 6. The first current command generator 20a generates the corresponding first current command according to the first torque command Tn1 and the first recycle lookup table. The second current command generator 20b generates the corresponding second current command according to the second torque command Tn2 and the power consumption lookup table.

Figure 6:
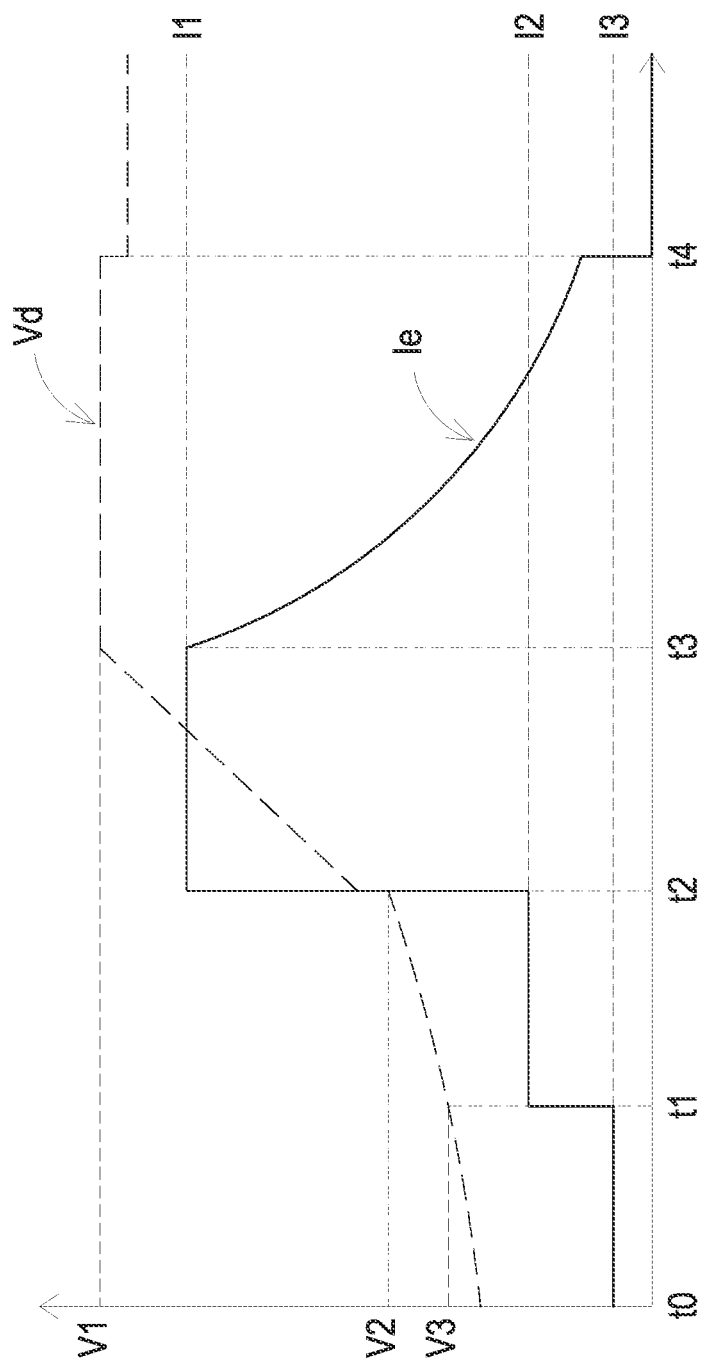
FIG. 6 is a plot illustrating the relationship between the voltage and the current of the secondary battery in the motor drive system as shown in FIG. 5 when a charging operation is performed.

FIG. 6 is a plot illustrating the relationship between the voltage and the current of the secondary battery in the motor drive system as shown in FIG. 5 when a charging operation is performed. In case that the value of the torque command is negative and the secondary battery 5 is in the normal working state and under charging operation, the secondary battery 5 is charged according to the charging strategy of FIG. 6. When the control unit of the motor drive system 1b judges that the value of the torque command Tn is negative, the secondary battery 5 is charged in a limited-current charging mode based on that the battery voltage Vd of the secondary battery 5 is lower than a preset reference voltage range (e.g. between the time point t0 and the time point t3). In the limited-current charging mode, the battery current Ie of the secondary battery 5 provided by the drive circuit is not higher than a preset reference current range. Further, the secondary battery 5 is charged in a limited-voltage charging mode based on that the battery voltage Vd of the secondary battery 5 is not lower than a preset reference voltage range (e.g. between the time point t3 and the time point t4). In the limited-voltage charging mode, the battery voltage corresponding to the battery current Ie of the secondary battery 5 provided by the drive circuit falls within the preset reference voltage range.

In an embodiment, the reference voltage range includes at least two reference voltage ranges. For example, as shown in FIG. 6, the reference voltage range includes a first reference voltage range V1, a second reference voltage range V2 smaller than the first reference voltage range V1, and a third reference voltage range V3 smaller than the second reference voltage range V2. For protecting the secondary battery 5 in the charging process, the battery voltage Vd is divided into several ranges according to the characteristics of the secondary battery 5. The first reference voltage range V1, the second reference voltage range V2, and the third reference voltage range V3 are collaboratively defined by the corresponding battery voltages Vd for dividing these ranges plus the voltage threshold ranges required for control. However, these voltage threshold ranges are not shown in FIG. 6 and the reference voltages ranges V1, V2 and V3 are simplified to straight lines. The reference current range includes at least two reference current ranges. For example, as shown in FIG. 6, the reference current range includes a first reference current range I1, a second reference current range I2 smaller than the first reference current range I1, and a third reference current range I3 smaller than the second reference current range I2. For protecting the secondary battery 5 in the charging process, the first reference current range I1, the second reference current range I2, and the third reference current range I3 are collaboratively defined by the battery currents in each charging range divided by the first reference voltage range V1, the second reference voltage range V2, and the third reference voltage range V3 plus the current threshold ranges required for control. However, these current threshold ranges are not shown in FIG. 6 and the reference current ranges I1, I2 and I3 are simplified to straight lines. Further, the limited-current charging mode includes at least two limited-current charging modes, such as a first limited-current charging mode, a second limited-current charging mode, and a third limited-current charging mode.

In the first limited-current charging mode, the control unit controls the drive circuit to provide the battery current Ie of the secondary battery 5 not higher than the first reference current range I1, that is, the upper limit of the battery current Ie of the secondary battery 5 is the first current value I1. In the second limited-current charging mode, the control unit controls the drive circuit to provide the battery current Ie of the secondary battery 5 not higher than the second reference current range I2, that is, the upper limit of the battery current Ie of the secondary battery 5 is the second current value I2. In the third limited-current charging mode, the control unit controls the drive circuit to provide the battery current Ie of the secondary battery 5 not higher than the third reference current range I3, that is, the upper limit of the battery current Ie of the secondary battery 5 is the third current value I3.

Further, when the control unit judges that the value of the torque command Tn is negative, the secondary battery 5 is charged in the first limited-current charging mode based on that the battery voltage Vd of the secondary battery 5 is lower than the first reference voltage range V1 and not lower than the second reference voltage range V2. Or, the secondary battery 5 is charged in the second limited-current charging mode based on that the battery voltage Vd of the secondary battery 5 is lower than the second reference voltage range V2 and not lower than the third reference voltage range V3. Alternatively, the secondary battery 5 is charged in the third limited-current charging mode based on that the battery voltage Vd of the secondary battery 5 is lower than the third reference voltage range V3.

When the secondary battery 5 is in the normal working state and under charging operation, the motor drive system 1b of FIG. 5 can be operated in one of plural operating modes. In a first operating mode of the motor drive system 1b, the first torque command Tn1 matches the torque command Tn, and no torque is outputted according to the second torque command Tn2. That is, the second electric motor 31 is disabled. The portion of the recycling power of the first electric motor 30 that is not offset by the consumed power of the first electric motor 30 is converted into the storage energy by the first drive circuit 40 to charge the secondary battery 5. In a second operating mode of the motor drive system 1b, both of the first torque command Tn1 and the second torque command Tn2 are not zero. The total output torque corresponding to the first torque command Tn1 and the second torque command Tn2 matches the output torque corresponding to the torque command Tn. The portion of the recycling power of the first electric motor 30 that is not offset by the consumed power of the first electric motor 30 is converted into the storage energy by the first drive circuit 40 to charge the secondary battery 5. Moreover, the consumed power of the second electric motor 31 and the recycling power of the second electric motor 31 are equal. In a third operating mode of the motor drive system 1b, both of the first torque command Tn1 and the second torque command Tn2 are not zero. The total output torque corresponding to the first torque command Tn1 and the second torque command Tn2 matches the output torque corresponding to the torque command Tn. The portion of the recycling power of the first electric motor 30 that is not offset by the consumed power of the first electric motor 30 is converted into the storage energy by the first drive circuit 40 to charge the secondary. The portion of the recycling power of the second electric motor 31 that is not offset by the consumed power of the second electric motor 31 is converted into the storage energy by the second drive circuit 41 to charge the secondary battery 5 as well. In a fourth operating mode of the motor drive system 1b, both of the first torque command Tn1 and the second torque command Tn2 are not zero. The total output torque corresponding to the first torque command Tn1 and the second torque command Tn2 matches the output torque corresponding to the torque command Tn. The consumed power of the second electric motor 31 is higher than the recycling power of the second electric motor 31. The portion of the recycling power of the first electric motor 30 that is not offset by the consumed power of the first electric motor 30 is converted into the storage energy by the first drive circuit 40 to charge the secondary battery 5 and/or is consumed by the second electric motor 31.

Please refer to FIG. 5 again. In an embodiment, the first negative torque current lookup table in the first current command generator 20a further contains the first recycle lookup table. The first recycle lookup table is a lookup table about the characteristics of the first electric motor 30, the recycling power of the first electric motor 30, and the relationship between the first torque command Tn1 and the first current command according to the first motor operating information when the first electric motor 30 is driven to output the negative torque. The operations of the motor drive system 1b in the first, second, third and fourth operating modes will be described in more details as follows.

In the first operating mode of the motor drive system 1b, the torque command Tn is distributed into the first torque command Tn1 and the second torque command Tn2 by the torque distribution unit 6. The first torque command Tn1 matches the torque command Tn, and no torque is outputted according to the second torque command Tn2. Under this circumstance, the current command generator 20a generates the first current command according to the first torque command Tn1 and the first recycle lookup table. Consequently, in the first operating mode, the consumed power of the first electric motor 30 is lower than the recycling power of the first electric motor 30. The portion of the recycling power of the first electric motor 30 that is not offset by the consumed power of the first electric motor 30 is converted into the storage energy by the first drive circuit 40. Consequently, the secondary battery 5 is charged by the storage energy. In the first operating mode, the recycling power of the first electric motor 30 makes the output power of the drive circuit conform to the limited-current charging mode or the limited-voltage charging mode of the secondary battery 5, which enables the secondary battery 5 to be charged in the limited-current charging mode or the limited-voltage charging mode, so that the secondary battery 5 is charged according to the charging strategy shown in FIG. 6.

In the second operating mode of the motor drive system 1b, the torque command Tn is distributed into the first torque command Tn1 and the second torque command Tn2 by the torque distribution unit 6. The total output torque corresponding to the first torque command Tn1 and the second torque command Tn2 matches the output torque corresponding to the torque command Tn. Under this circumstance, the current command generator 20a generates the first current command according to the first torque command Tn1 and the first recycle lookup table, and the second current command generator 20b generates the corresponding second current command according to the second torque command Tn2 and the second zero recycle lookup table. Consequently, in the second operating mode, the consumed power of the first electric motor 30 is lower than the recycling power of the first electric motor 30. The portion of the recycling power of the first electric motor 30 that is not offset by the consumed power of the first electric motor 30 is converted into the storage energy by the first drive circuit 40 to charge the secondary battery 5. Moreover, the consumed power of the second electric motor 31 and the recycling power of the second electric motor 31 are equal. In the second operating mode, the recycling power of the first electric motor 30 makes the output power of the drive circuit conform to the limited-current charging mode or the limited-voltage charging mode of the secondary battery 5, which enables the secondary battery 5 to be charged in the limited-current charging mode or the limited-voltage charging mode, so that the secondary battery 5 is charged according to the charging strategy shown in FIG. 6.

In the third operating mode of the motor drive system 1b, the torque command Tn is distributed into the first torque command Tn1 and the second torque command Tn2 by the torque distribution unit 6. The total output torque corresponding to the first torque command Tn1 and the second torque command Tn2 matches the output torque corresponding to the torque command Tn. Under this circumstance, the current command generator 20a generates the first current command according to the first torque command Tn1 and the first recycle lookup table, and the second current command generator 20b generates the corresponding second current command according to the second torque command Tn2 and the second recycle lookup table. Consequently, in the third operating mode, the consumed power of the first electric motor 30 is lower than the recycling power of the first electric motor 30. The portion of the recycling power of the first electric motor 30 that is not offset by the consumed power of the first electric motor 30 is converted into the storage energy by the first drive circuit 40 to charge the secondary battery 5. Moreover, the consumed power of the second electric motor 31 is lower than the recycling power of the second electric motor 31. The portion of the recycling power of the second electric motor 31 that is not offset by the consumed power of the second electric motor 31 is converted into the storage energy by the second drive circuit 41 to charge the secondary battery 5 as well. In the third operating mode, the recycling power of the first electric motor 30 and the recycling power of the second electric motor 31 make the output power of the drive circuit conform to the limited-current charging mode or the limited-voltage charging mode of the secondary battery 5, which enables the secondary battery 5 to be charged in the limited-current charging mode or the limited-voltage charging mode, so that the secondary battery 5 is charged according to the charging strategy shown in FIG. 6.

In the fourth operating mode of the motor drive system 1b, the torque command Tn is distributed into the first torque command Tn1 and the second torque command Tn2 by the torque distribution unit 6. The total output torque corresponding to the first torque command Tn1 and the second torque command Tn2 matches the output torque corresponding to the torque command Tn. Under this circumstance, the current command generator 20a generates the first current command according to the first torque command Tn1 and the first recycle lookup table, and the second current command generator 20b generates the corresponding second current command according to the second torque command Tn2 and the power consumption lookup table. Consequently, in the fourth operating mode, the consumed power of the first electric motor 30 is lower than the recycling power of the first electric motor 30, but the consumed power of the second electric motor 31 is higher than the recycling power of the second electric motor 31. The portion of the recycling power of the first electric motor 30 that is not offset by the consumed power of the first electric motor 30 can be converted into the storage energy by the first drive circuit 40 to charge the secondary battery 5. Alternatively, the portion of the recycling power of the first electric motor 30 that is not offset by the consumed power of the first electric motor 30 is consumed by the second electric motor 31. In the fourth operating mode, the recycling power of the first electric motor 30 is offset by the consumed power of the second electric motor 31, which makes the output power of the drive circuit conform to the limited-current charging mode or the limited-voltage charging mode of the secondary battery 5 and enables the secondary battery 5 to be charged in the limited-current charging mode or the limited-voltage charging mode, so that the secondary battery 5 is charged according to the charging strategy shown in FIG. 6.

Figure 7:
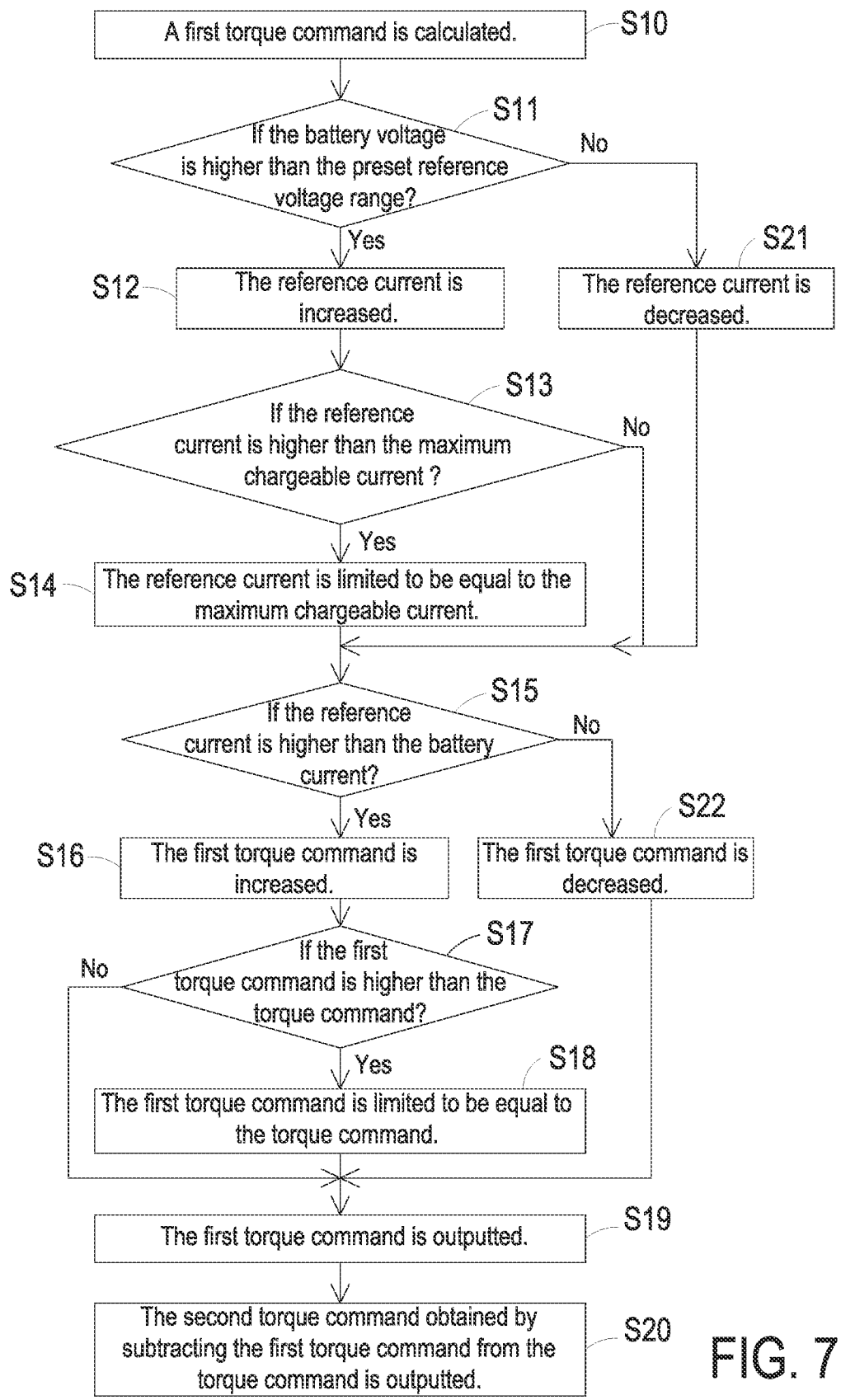
FIG. 7 is a flowchart illustrating a torque distribution method for a motor drive system as shown in FIG. 5.

Please refer to FIGS. 5, 6 and 7. FIG. 7 is a flowchart illustrating a torque distribution method for a motor drive system as shown in FIG. 5. A preset reference voltage range and a preset reference current range are previously stored in the torque distribution unit 6 of the motor drive system 1b. The reference voltage falls within the reference voltage range, and the reference current falls within the reference current range. The torque distribution method is implemented by the torque distribution unit 6. The torque distribution method includes the following steps.

Firstly, in a step S10, a first torque command Tn1 is calculated by the torque distribution unit 6 according to a torque command Tn. The method of calculating the first torque command Tn1 may be determined according to the practical requirements.

Then, in a step S11, the torque distribution unit 6 judges whether the battery voltage Vd of the secondary battery 5 is higher than or equal to the preset reference voltage range of the torque distribution unit 6.

If the torque distribution unit 6 judges that the battery voltage Vd of the secondary battery 5 is higher than or equal to the reference voltage range, the reference current is increased by the torque distribution unit 6 (Step S12).

Then, in a step S13, the torque distribution unit 6 judges whether the reference current is higher than the maximum chargeable current. In this embodiment, the maximum chargeable current is determined according to the battery voltage Vd of the secondary battery 5 in different voltage ranges. If the reference current is higher than the maximum chargeable current, it means that the battery current Ie of the secondary battery 5 provided by the drive circuit reaches the upper limit of the reference current range corresponding to the battery voltage Vd of the secondary battery 5.

If the torque distribution unit 6 judges that the reference current is higher than the maximum chargeable current, the reference current is limited to be equal to the maximum chargeable current by the torque distribution unit 6 (Step S14).

Then, in a step S15, the torque distribution unit 6 judges whether the reference current is higher than the battery current Ie of the secondary battery 5.

If the torque distribution unit 6 judges that the reference current is higher than the battery current Ie of the secondary battery 5, the first torque command Tn1 is increased by the torque distribution unit 6 (Step S16).

Then, in a step S17, the torque distribution unit 6 judges whether the first torque command Tn1 is higher than the torque command Tn.

If the first torque command Tn1 is higher than the torque command Tn, the first torque command Tn1 is limited to be equal to the torque command Tn (Step S18).

Then, in a step S19, the torque distribution unit 6 outputs the first torque command Tn1 to the first control unit 2a.

Then, in a step S20, the torque distribution unit 6 outputs the second torque command Tn2 to the second control unit 2b according to the result of subtracting the first torque command Tn1 from the torque command Tn.

If the judging result of the step S11 indicates that the battery voltage Vd of the secondary battery 5 is lower than the preset reference voltage range, a step S21 is performed. In the step S21, the reference current is decreased by the torque distribution unit 6. For example, the reference current is decreased to zero. Then, the step S15 is performed.

If the judging result of the step S15 indicates that the reference current is not higher than the battery current Ie of the secondary battery 5, a step S22 is performed. In the step S22, the first torque command Tn1 is decreased by the torque distribution unit 6. For example, the first torque command Tn1 is decreased to zero. Then, the step S19 is performed.

If the judging result of the step S13 indicates that the reference current is not higher than the maximum chargeable current, the step S15 is performed. Further, if the judging result of the step S17 indicates that the first torque command Tn1 is not higher than the torque command Tn, the step S19 is performed.

As mentioned above, in case that the battery voltage Vd of the secondary battery 5 is not lower than the full threshold value, the secondary battery 5 can still be charged according to the charging strategy of FIG. 6. That is, the torque distribution unit 6 distributes the first torque command Tn1 and the second torque command Tn2 according to the battery voltage Vd of the secondary battery 5, the battery current Ie of the secondary battery 5 and the torque command Tn. In case that the battery voltage Vd and the reference voltage are different, the reference current is adjusted by the torque distribution unit 6. For example, if the reference voltage is higher than the battery voltage Vd, the reference current is increased by the torque distribution unit 6. However, the reference current is not higher than the maximum chargeable current. Whereas, if the reference voltage is lower than the battery voltage Vd, the reference current is decreased by the torque distribution unit 6. In case that the battery current Ie and the reference current are different, the first torque command Tn1 is adjusted by the torque distribution unit 6. For example, if the reference current is higher than the battery current Ie, the first torque command Tn1 is increased by the torque distribution unit 6. However, the first torque command Tn1 is not higher than the torque command Tn. Whereas, if the reference current is lower than the battery current Ie, the first torque command Tn1 is decreased by the torque distribution unit 6.

From the above descriptions, the present invention provides a motor drive system and a torque distribution method of the motor drive system. The control unit of the motor drive system issues the current command according to the torque command, the motor operating information of the electric motor, and the zero recycle lookup table to control the operations of the electric motor. Accordingly, the recycling power of the electric motor is suppressed by the consumed power of the electric motor. Consequently, the braking applications of the electric motor are increased, and the reliability of the braking process is enhanced. Moreover, the mechanical wear and the accumulated heat are reduced, and the motor drive system is not damaged by the recycling power. Since no additional devices are required to consume the recycling power, the space utilization of the motor drive system is increased, and the fabricating cost is reduced. In another embodiment, the motor drive system includes two electric motors and a secondary battery. In response to a torque command, the two electric motors are controlled to cooperatively work to generate recycling power. The secondary battery is charged by the recycling power according to a designed charging strategy. Consequently, the secondary battery is effectively protected.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A motor drive system, comprising:
an electric motor;

a drive circuit for converting an input power into a driving current, wherein the driving current is provided to the electric motor to drive the electric motor; and a control unit receiving a torque command, and comprising a current command generator, wherein the current command generator generates a current command according to the torque command and a motor operating information of the electric motor, and the current command contains a d-axis current command and/or a q-axis current command, wherein the driving current is converted into a d-axis current and/or a q-axis current by the control unit through coordinate conversion, and the drive circuit is controlled by the control circuit, so that the driving current is close to the d-axis current command and/or the q-axis current command corresponding to the current command, wherein the current command generator contains a maximum torque per ampere (MTPA) lookup table and a zero recycle lookup table, wherein the MTPA lookup table is a lookup table about a relationship between the torque command and the current command according to the motor operating information when a consumed power of the electric motor is the lowest, and the zero recycle lookup table is a lookup table about a relationship between the torque command and the current command according to the motor operating information when the consumed power of the electric motor and a recycling power of the electric motor are offset, wherein if a value of the torque command is positive, the current command generator generates the corresponding current command according to the MTPA lookup table, wherein if the value of the torque command is negative, the current command generator generates the corresponding current command according to the zero recycle lookup table.

2. The motor drive system according to claim 1, further comprising a secondary battery, wherein the secondary battery provides the input power to the drive circuit, wherein under control of the control unit, the drive circuit provides the driving current to the electric motor, or charges the secondary battery, wherein if the value of the torque command is negative and a battery voltage of the secondary battery is not lower than a full threshold value or the secondary battery is abnormal, the current command generator generates the corresponding current command according to the zero recycle lookup table.

3. The motor drive system according to claim 2, wherein if the value of the torque command is negative and the battery voltage of the secondary battery is lower than the full threshold value, the current command generator generates the corresponding current command according to the MTPA lookup table, and the control unit controls the drive circuit to charge the secondary battery.

4. The motor drive system according to claim 1, wherein the control unit further receives a temperature information about an ambient temperature of the electric motor, and the zero recycle lookup table further records a relationship between the torque command and the current command at different rotating speeds and at different ambient temperatures when the consumed power of the electric motor and the recycling power of the electric motor are offset, wherein if the value of the torque command is negative, the current command generator adjusts the current command according to the corresponding torque command, the corresponding rotating speed and the corresponding ambient temperature by referring to the zero recycle lookup table, so that the recycling power of the electric motor is completely suppressed by the consumed power of the electric motor, wherein the motor operating information contains the rotating speed and the ambient temperature of the electric motor.

5. A motor drive system, comprising:

an electric motor comprising a first electric motor and a second electric motor;

a drive circuit comprising a first drive circuit and a second drive circuit for converting an input power into a first driving current provided to the first electric motor to drive the first electric motor and into a second driving current provided to the second electric motor to drive the second electric motor, respectively; and a control unit comprising a torque distribution unit, a first control unit and a second control unit, wherein the torque distribution unit receives a torque command and distributes the torque command into a first torque command and a second torque command to the first control unit and the second control unit, respectively, wherein the first control unit comprises a first current command generator, the first current command generator generates a first current command according to the first torque command and a first motor operating information of the first electric motor, and the first current command contains a first d-axis current command and/or a first q-axis current command, wherein the first driving current is converted into a first d-axis current and/or a first q-axis current by the first control unit through coordinate conversion, and the first drive circuit is controlled by the first control circuit, so that the first driving current is close to the first d-axis current command and/or the first q-axis current command corresponding to the first current command, wherein the second control unit comprises a second current command generator, the second current command generator generates a second current command according to the second torque command and a second motor operating information of the second electric motor, and the second current command contains a second d-axis current command and/or a second q-axis current command, wherein the second driving current is converted into a second d-axis current and/or a second q-axis current by the second control unit through coordinate conversion, and the second drive circuit is controlled by the second control circuit, so that the second driving current is close to the second d-axis current command and/or the second q-axis current command corresponding to the second current command, wherein the first current command generator contains a first negative torque current lookup table, and the first negative torque current lookup table is a lookup table about a relationship between the first torque command and the first current command when the first electric motor is driven to output a negative torque according to the first motor operating information of the first electric motor, wherein the second current command generator contains a second negative torque current lookup table, and the second negative torque current lookup table is a lookup table about a relationship between the second torque command and the second current command when the second electric motor is driven to output a negative torque according to the second motor operating information of the second electric motor, wherein if a value of the first torque command is negative, the first current command generator generates the corresponding first current command according to the first negative torque current lookup table, wherein if a value of the second torque command is negative, the second current command generator generates the corresponding second current command according to the second negative torque current lookup table.

6. The motor drive system according to claim 5, wherein the first negative torque current lookup table contains a first zero recycle lookup table, and the first zero recycle lookup table is a lookup table about a relationship between the first torque command and the first current command according to the first motor operating information when a consumed power of the first electric motor and a recycling power of the first electric motor are offset, wherein the second negative torque current lookup table contains a second zero recycle lookup table, and the second zero recycle lookup table is a lookup table about a relationship between the second torque command and the second current command according to the second motor operating information when a consumed power of the second electric motor and a recycling power of the second electric motor are offset, wherein if the value of the first torque command is negative, the first current command generator generates the corresponding first current command according to the first zero recycle lookup table of the first negative torque current lookup table, wherein if the value of the second torque command is negative, the second current command generator generates the corresponding second current command according to the second zero recycle lookup table of the second negative torque current lookup table.

7. The motor drive system according to claim 6, further comprising a secondary battery, wherein the secondary battery provides the input power to the first drive circuit and the second drive circuit, wherein under control of the first control unit and the second control unit, the first drive circuit and the second drive circuit respectively provide the first driving current and the second driving current to the first electric motor and the second electric motor, or the first drive circuit and the second drive circuit charge the secondary battery, wherein if the value of the torque command is negative and a battery voltage of the secondary battery is not lower than a full threshold value or the secondary battery is abnormal, the torque command is distributed into the first torque command and the second torque command by the torque distribution unit, wherein the first current command generator generates the corresponding first current command according to the first torque command and the first zero recycle lookup table, and the second current command generator generates the corresponding second current command according to the second torque command and the second zero recycle lookup table.

8. The motor drive system according to claim 7, wherein the second negative torque current lookup table further contains a second recycle lookup table, and the second recycle lookup table is a lookup table about characteristics of the second electric motor, a recycling power of the second electric motor, and a relationship between the second torque command and the second current command according to the second motor operating information when the second electric motor is driven to output a negative torque, wherein if the value of the torque command is negative and the battery voltage of the secondary battery is lower than the full threshold value, the torque command is distributed into the first torque command and the second torque command by the torque distribution unit, wherein the first current command generator generates the corresponding first current command according to the first torque command and the first zero recycle lookup table, and the second current command generator generates the corresponding second current command according to the second torque command and the second recycle lookup table.

9. The motor drive system according to claim 8, wherein the second recycle lookup table is a maximum torque per ampere (MTPA) lookup table, and the MTPA lookup table is a lookup table about a relationship between the second torque command and the second current command according to the second motor operating information when the consumed power of the second electric motor is the lowest.

10. The motor drive system according to claim 7, wherein the second negative torque current lookup table further contains a power consumption lookup table, and the power consumption lookup table is a lookup table about characteristics of the second electric motor, a consumed power of the second electric motor, and a relationship between the second torque command and the second current command according to the second motor operating information when the second electric motor is driven to output a negative torque, wherein if the value of the torque command is negative, the battery voltage of the secondary battery is lower than a full threshold value and the secondary battery provides electricity normally, the torque command is distributed into a first torque command and a second torque command by the torque distribution unit, wherein the first current command generator generates the corresponding first current command according to the first torque command and the first zero recycle lookup table, and the second current command generator generates the corresponding second current command according to the second torque command and the power consumption lookup table.

11. The motor drive system according to claim 6, wherein the first control unit further receives a first temperature information about an ambient temperature of the first electric motor, and the first zero recycle lookup table further records a relationship between the first torque command and the first current command at different rotating speeds and at different ambient temperatures when the consumed power of the first electric motor and the recycling power of the first electric motor are offset, wherein the second control unit further receives a second temperature information about an ambient temperature of the second electric motor, and the second zero recycle lookup table further records a relationship between the second torque command and the second current command at different rotating speeds and at different ambient temperatures when the consumed power of the second electric motor and the recycling power of the second electric motor are offset, wherein the first motor operating information contains the rotating speed and the ambient temperature of the first electric motor, and the second motor operating information contains the rotating speed and the ambient temperature of the second electric motor.

12. The motor drive system according to claim 5, further comprising a secondary battery, wherein the secondary battery provides the input power to the first drive circuit and the second drive circuit, wherein under control of the first control unit and the second control unit, the first drive circuit and the second drive circuit respectively provide the first driving current and the second driving current to the first electric motor and the second electric motor, or the first drive circuit and the second drive circuit charge the secondary battery,
- wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output the negative torque,
- wherein the second negative torque current lookup table further contains a power consumption lookup table, and the power consumption lookup table is a lookup table about characteristics of the second electric motor, a consumed power of the second electric motor, and a relationship between the second torque command and the second current command according to the second motor operating information when the second electric motor is driven to output a negative torque,
- wherein if the value of the torque command is negative, a battery voltage of the secondary battery is lower than a full threshold value and the secondary battery provides electricity normally, the torque command is distributed into a first torque command and a second torque command by the torque distribution unit, wherein the first current command generator generates the corresponding first current command according to the first torque command and the first recycle lookup table, and the second current command generator generates the corresponding second current command according to the second torque command and the power consumption lookup table.

13. The motor drive system according to claim 5, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output the negative torque,
- wherein the second negative torque current lookup table further contains a power consumption lookup table, and the power consumption lookup table is a lookup table about characteristics of the second electric motor, a consumed power of the second electric motor, and a relationship between the second torque command and the second current command according to the second motor operating information when the second electric motor is driven to output a negative torque,
- wherein if the value of the torque command is negative, the torque command is distributed into a first torque command and a second torque command by the torque distribution unit, wherein the first current command generator generates the corresponding first current command according to the first torque command and the first recycle lookup table, and the second current command generator generates the corresponding second current command according to the second torque command and the power consumption lookup table,
- wherein the recycling power of the first electric motor and the consumed power of the second electric motor are offset.

14. The motor drive system according to claim 5, further comprising a secondary battery, wherein the secondary battery provides the input power to the first drive circuit and the second drive circuit, wherein under control of the first control unit and the second control unit, the first drive circuit and the second drive circuit respectively provide the first driving current and the second driving current to the first electric motor and the second electric motor, or the first drive circuit and the second drive circuit charge the secondary battery,
- wherein if the value of the torque command is negative and a battery voltage of the secondary battery is lower than a preset reference voltage range, the secondary battery is charged in a limited-current charging mode,
- wherein if the value of the torque command is negative and the battery voltage of the secondary battery is not lower than the preset reference voltage range, the secondary battery is charged in a limited-voltage charging mode,
- wherein in the limited-current charging mode, a battery current of the secondary battery provided by the first drive circuit and the second drive circuit is not higher than a preset reference current range, wherein in the limited-voltage charging mode, the battery voltage of the secondary battery provided by the first drive circuit and the second drive circuit is not higher than the preset reference voltage range.

15. The motor drive system according to claim 14, wherein the reference voltage range comprises a first reference voltage range and a second reference voltage range smaller than the first reference voltage range, the reference current range comprises a first reference current range a second reference current range smaller than the first reference current range, and the limited-current charging mode comprises a first limited-current charging mode and a second limited-current charging mode,
- wherein in the first limited-current charging mode, the battery current of the secondary battery is not higher than the first reference current range, and in the second limited-current charging mode, the battery current of the secondary battery is not higher than the second reference current range,
- wherein if the value of the torque command is negative, the secondary battery is charged in the first limited-current charging mode based on that the battery voltage of the secondary battery is lower than the first reference voltage range and not lower than the second reference voltage range, or the secondary battery is charged in the second limited-current charging mode based on that the battery voltage of the secondary battery is lower than the second reference voltage range.

16. The motor drive system according to claim 14, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the torque command is distributed into the first torque command and the second torque command by the torque distribution unit, wherein the first torque command matches the torque command and no torque is outputted according to the second torque command, wherein the first current command generator generates the first current command according to the first torque command and the first recycle lookup table, wherein the recycling power of the first electric motor enables the secondary battery to be charged in the limited-current charging mode or the limited-voltage charging mode.

17. The motor drive system according to claim 14, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a second zero recycle lookup table, and the second zero recycle lookup table is a lookup table about a relationship between the second torque command and the second current command according to the second motor operating information when a consumed power of the second electric motor and a recycling power of the second electric motor are offset, wherein the torque command is distributed into the first torque command and the second torque command by the torque distribution unit, wherein the first current command generator generates the first current command according to the first torque command and the first recycle lookup table, and the second current command generator generates the second current command according to the second torque command and the second recycle lookup table, wherein the recycling power of the first electric motor enables the secondary battery to be charged in the limited-current charging mode or the limited-voltage charging mode.

18. The motor drive system according to claim 14, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a second recycle lookup table, and the second recycle lookup table is a lookup table about characteristics of the second electric motor, a recycling power of the second electric motor, and a relationship between the second torque command and the second current command according to the second motor operating information when the second electric motor is driven to output the negative torque, wherein the torque command is distributed into the first torque command and the second torque command by the torque distribution unit, wherein the first current command generator generates the first current command according to the first torque command and the first recycle lookup table, and the second current command generator generates the second current command according to the second torque command and the second recycle lookup table, wherein the recycling power of the first electric motor and the recycling power of the second electric motor enable the secondary battery to be charged in the limited-current charging mode or the limited-voltage charging mode.

19. The motor drive system according to claim 14, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a power consumption lookup table, and the power consumption lookup table is a lookup table about characteristics of the second electric motor, a consumed power of the second electric motor, and a relationship between the second torque command and the second current command according to the second motor operating information when the second electric motor is driven to output the negative torque, wherein the torque command is distributed into the first torque command and the second torque command by the torque distribution unit, wherein the first current command generator generates the first current command according to the first torque command and the first recycle lookup table, and the second current command generator generates the corresponding second current command according to the second torque command and the power consumption lookup table, wherein the recycling power of the first electric motor and the consumed power of the second electric motor are offset, which enables the secondary battery to be charged in the limited-current charging mode or the limited-voltage charging mode.

20. A torque distribution method applied to the torque distribution unit of the motor drive system according to claim 14, comprising steps of:
(a) calculating the first torque command according to the torque command;
(b) judging if the battery voltage of the secondary battery is higher than the preset reference voltage range;
(c) if a judging result of the step (b) is yes, increasing the reference current;
(d) judging if the reference current is higher than a maximum chargeable current;
(e) if a judging result of the step (d) is yes, limiting the reference current to be equal to the maximum chargeable current;
(f) judging if the reference current is higher than the battery current of the secondary battery;
(g) if a judging result of the step (f) is yes, increasing the first torque command;
(h) judging if the first torque command is higher than the torque command;
(i) if a judging result of the step (h) is yes, limiting the first torque command to be equal to the torque command;
(j) outputting the first torque command;
(k) outputting the second torque command obtained by subtracting the first torque command from the torque command;
(l) if a judging result of the step (b) is no, decreasing the reference current and performing the step (f); and
(m) if a judging result of the step (f) is no, decreasing the first torque command and performing the step (j),
wherein if a judging result of the step (d) is no, the step (f) is performed.

21. The torque distribution method according to claim 20, wherein the maximum chargeable current is determined according to the battery voltage of the secondary battery in different voltage ranges.

22. The torque distribution method according to claim 20, wherein the reference voltage range comprises a first reference voltage range and a second reference voltage range smaller than the first reference voltage range, the reference current range comprises a first reference current range a second reference current range smaller than the first reference current range, and the limited-current charging mode comprises a first limited-current charging mode and a second limited-current charging mode, wherein in the first limited-current charging mode, the battery current of the secondary battery is not higher than the first reference current range, and in the second limited-current charging mode, the battery current of the secondary battery is not higher than the second reference current range, wherein if the value of the torque command is negative, the secondary battery is charged in the first limited-current charging mode based on that the battery voltage of the secondary battery is lower than the first reference voltage range and not lower than the second reference voltage range, or the secondary battery is charged in the second limited-current charging mode based on that the battery voltage of the secondary battery is lower than the second reference voltage range.

23. The torque distribution method according to claim 20, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the torque command is distributed into the first torque command and the second torque command by the torque distribution unit, wherein the first torque command matches the torque command and no torque is outputted according to the second torque command, wherein the first current command generator generates the first current command according to the first torque command and the first recycle lookup table, wherein the recycling power of the first electric motor enables the secondary battery to be charged in the limited-current charging mode or the limited-voltage charging mode.

24. The torque distribution method according to claim 20, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a second zero recycle lookup table, and the second zero recycle lookup table is a lookup table about a relationship between the second torque command and the second current command according to the second motor operating information when a consumed power of the second electric motor and a recycling power of the second electric motor are offset, wherein the torque command is distributed into the first torque command and the second torque command by the torque distribution unit, wherein the first current command generator generates the first current command according to the first torque command and the first recycle lookup table, and the second current command generator generates the second current command according to the second torque command and the second recycle lookup table, wherein the recycling power of the first electric motor enables the secondary battery to be charged in the limited-current charging mode or the limited-voltage charging mode.

25. The torque distribution method according to claim 20, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a second recycle lookup table, and the second recycle lookup table is a lookup table about characteristics of the second electric motor, a recycling power of the second electric motor, and a relationship between the second torque command and the second current command according to the second motor operating information when the second electric motor is driven to output the negative torque, wherein the torque command is distributed into the first torque command and the second torque command by the torque distribution unit, wherein the first current command generator generates the first current command according to the first torque command and the first recycle lookup table, and the second current command generator generates the second current command according to the second torque command and the second recycle lookup table, wherein the recycling power of the first electric motor and the recycling power of the second electric motor enable the secondary battery to be charged in the limited-current charging mode or the limited-voltage charging mode.

26. The torque distribution method according to claim 20, wherein the first negative torque current lookup table further contains a first recycle lookup table, and the first recycle lookup table is a lookup table about characteristics of the first electric motor, a recycling power of the first electric motor, and a relationship between the first torque command and the first current command according to the first motor operating information when the first electric motor is driven to output a negative torque, wherein the second negative torque current lookup table further contains a power consumption lookup table, and the power consumption lookup table is a lookup table about characteristics of the second electric motor, a consumed power of the second electric motor, and a relationship between the second torque command and the second current command according to the second motor operating information when the second electric motor is driven to output the negative torque, wherein the torque command is distributed into the first torque command and the second torque command by the torque distribution unit, wherein the first current command generator generates the first current command according to the first torque command and the first recycle lookup table, and the second current command generator generates the corresponding second current command according to the second torque command and the power consumption lookup table, wherein the recycling power of the first electric motor and the consumed power of the second electric motor are offset, which enables the secondary battery to be charged in the limited-current charging mode or the limited-voltage charging mode.

* * * * *